J. E. SPECKER.
AUTOMATIC DOOR.
APPLICATION FILED MAY 7, 1920.

1,390,174.

Patented Sept. 6, 1921.

Inventor
J.E. Specker,
By
Attorney

UNITED STATES PATENT OFFICE.

JOHN ERNEST SPECKER, OF REE HEIGHTS, SOUTH DAKOTA.

AUTOMATIC DOOR.

1,390,174.  Specification of Letters Patent.  Patented Sept. 6, 1921.

Application filed May 7, 1920. Serial No. 379,551.

*To all whom it may concern:*

Be it known that I, JOHN ERNEST SPECKER, a citizen of the United States of America, residing at Ree Heights, in the county of Hand and State of South Dakota, have invented new and useful Improvements in Automatic Doors, of which the following is a specification:

The object of the invention is to provide a door or closure for stock pens particularly designed for hogs and intended to normally close the "crawl holes" of hog pens to exclude snow and wind while permitting the hogs to enter by rooting, the primary utility of such a device being apparent in those sections of the country in which, while it is desirable to permit the hogs a certain degree of freedom, the storms are such as to render the pens or closures more or less untenable or at least uncomfortable if left open as in the ordinary practice; and with these objects in view the invention consists in a construction and combination of parts of which a preferred embodiment is shown in the accompanying drawing, wherein:

Figure 1:
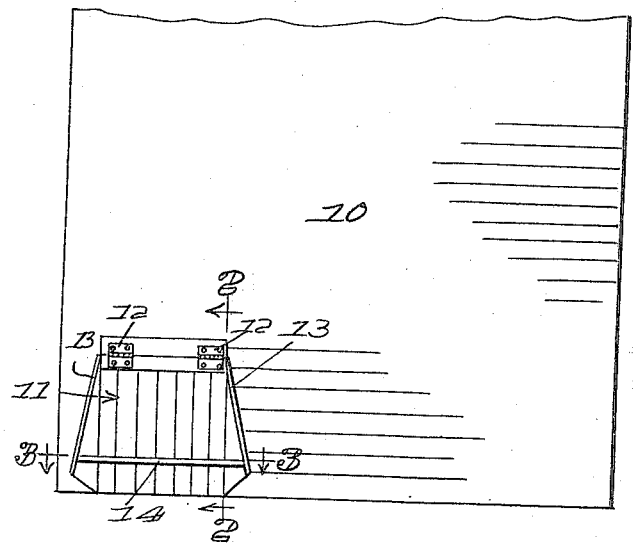
Figure 1 is an elevation of a "crawl hole" door or closure constructed in accordance with the invention.
Figure 2:
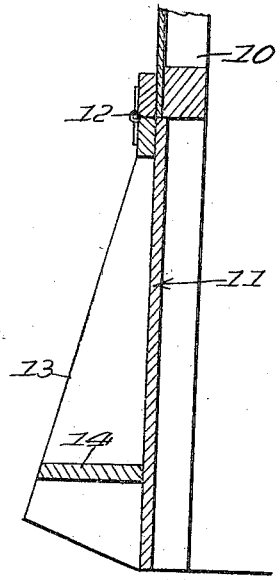
Fig. 2 is a vertical sectional view of the same on the plane indicated by the line 2—2 of Fig. 1.
Figure 3:
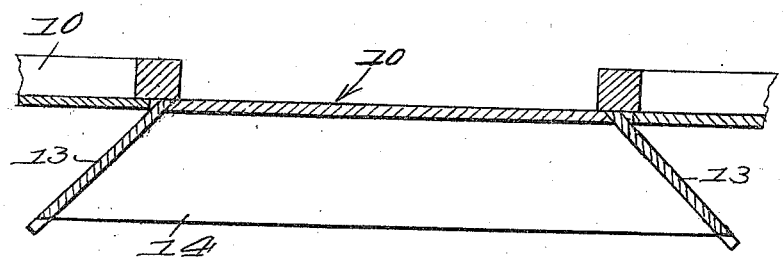
Fig. 3 is a horizontal sectional view on the plane indicated by the line 3—3 of Fig. 1.

In order that the closure may be effective in excluding snow and wind it is hinged to swing or open outwardly with relation to the pen, of which a wall is indicated at 10, the door 11 being suspended by the hinges 12, and obviously in order that an animal outside of the pen may gain access thereto it is necessary to swing the door outwardly or toward the animal. To provide for such an operation by the animal the door or closure is provided at each edge with an outwardly and laterally directed wing or flange 13 disposed at an angle of approximately 45 degrees to the plane of the door or closure, said wings being connected transversely by a horizontal ledge 14 which serves as a brace and also as a supplemental counter-weight to insure the swinging of the door when released to a closed position, and also as a convenient grip by which the door may be opened by hand. This ledge also by reason of being located close to the lower edge of the door serves to a degree as a shield to prevent the snow from drifting or packing close to the lower edge of the door and thus interferring seriously with the outward swinging movement thereof.

The tendency of the animal, particularly of the hog family, in endeavoring to gain access to the pen is to nose around the edges of the door or closure serving to prevent free access, and in so doing the snout is forced between the inclined or diagonally disposed wing 13 and the side wall of the pen with the result that the lower edge of the door is moved outward, and obviously a very slight movement, sufficient to enable the animal to insert the snout will be followed by a sufficient opening of the door to permit ingress. It has been found in practice that the animals learn very quickly to operate the door and as it may be opened by a very slight pressure from the inside, the presence of the barrier while effectually excluding the weather and keeping the interior of the pen at a proper temperature, forms no serious obstacle to the free inward and outward movements of the occupants thereof.

What is claimed is:

A closure for stock pens having a door hinged at its upper edge for outward swinging movement and provided at its side edges with outwardly divergent wings connected near the plane of the lower edge of the door by a horizontal outwardly projecting ledge.

In testimony whereof I affix my signature.

JOHN ERNEST SPECKER.